(12) United States Patent
Shepherd et al.

(10) Patent No.: US 10,752,789 B2
(45) Date of Patent: Aug. 25, 2020

(54) COATING MATERIAL

(71) Applicants: ADVANCED INSULATION PLC, Gloucester, Gloucestershire (GB); DOW CORNING CORPORATION, Midland, MI (US)

(72) Inventors: Simon Harry Shepherd, Gloucester (GB); Laura Jordan, Gloucester (GB)

(73) Assignees: ADVANCED INSULATION LIMITED (GB); DOW SILICONES CORPORATION, Midland, MI (US)

( * ) Notice: Subject to any disclaimer, the term of this patent is extended or adjusted under 35 U.S.C. 154(b) by 38 days.

(21) Appl. No.: 15/563,794

(22) PCT Filed: Apr. 4, 2016

(86) PCT No.: PCT/GB2016/050949
§ 371 (c)(1),
(2) Date: Oct. 2, 2017

(87) PCT Pub. No.: WO2016/156881
PCT Pub. Date: Oct. 6, 2016

(65) Prior Publication Data
US 2018/0079914 A1    Mar. 22, 2018

(30) Foreign Application Priority Data

Apr. 2, 2015 (GB) .................................. 1505769.8
Jan. 28, 2016 (GB) .................................. 1601605.7

(51) Int. Cl.
| | | |
|---|---|---|
| *C09D 5/18* | (2006.01) | |
| *C09D 183/06* | (2006.01) | |
| *C09D 7/61* | (2018.01) | |
| *C09D 7/40* | (2018.01) | |
| *C09D 183/10* | (2006.01) | |
| *C08G 77/12* | (2006.01) | |
| *C08G 77/20* | (2006.01) | |
| *C08K 3/04* | (2006.01) | |
| *C08L 83/06* | (2006.01) | |
| *C08K 3/22* | (2006.01) | |
| *C08K 3/016* | (2018.01) | |
| *C08L 83/00* | (2006.01) | |
| *C08K 3/26* | (2006.01) | |
| *C08K 3/34* | (2006.01) | |
| *C08K 3/36* | (2006.01) | |
| *C08K 7/04* | (2006.01) | |
| *C08K 7/20* | (2006.01) | |

(52) U.S. Cl.
CPC ............... *C09D 5/185* (2013.01); *C09D 7/61* (2018.01); *C09D 7/69* (2018.01); *C09D 183/06* (2013.01); *C09D 183/10* (2013.01); *C08G 77/12* (2013.01); *C08G 77/20* (2013.01); *C08K 3/016* (2018.01); *C08K 3/04* (2013.01); *C08K 3/346* (2013.01); *C08K 3/36* (2013.01); *C08K 7/04* (2013.01); *C08K 7/20* (2013.01); *C08K 2003/2224* (2013.01); *C08K 2003/265* (2013.01); *C08K 2201/005* (2013.01); *C08K 2201/014* (2013.01); *C08L 83/00* (2013.01); *C08L 83/06* (2013.01)

(58) Field of Classification Search
None
See application file for complete search history.

(56) References Cited

U.S. PATENT DOCUMENTS

| | | | |
|---|---|---|---|
| 3,114,840 A | | 12/1963 | Johnston |
| 4,286,013 A | * | 8/1981 | Daroga ................. B29C 70/025 428/333 |
| 4,686,244 A | | 8/1987 | Dietlein et al. |
| 5,262,454 A | * | 11/1993 | Leroux .................... C08K 3/04 523/218 |

(Continued)

FOREIGN PATENT DOCUMENTS

| | | |
|---|---|---|
| CA | 2918648 A1 | 2/2015 |
| WO | 2015/007629 A1 | 1/2015 |

OTHER PUBLICATIONS

Wakatake T: "Flame-retardant resin composition used for fire-proof structure component, contains polyurethane and imparting fire-resistant material including ammonium polyphosphate, aluminum hydroxide, nitrogen compound and expanded graphite", WPI/THOMSON, vol. 2012, No. 22, Mar. 15, 2012, XP-002734195, the whole document & JP 2012 052092 A (Fire Proof Technology Co Ltd) Mar. 15, 2012 (Mar. 15, 2012).

(Continued)

*Primary Examiner* — Robert T Butcher
(74) *Attorney, Agent, or Firm* — Tarolli, Sundheim, Covell & Tummino LLP

(57) ABSTRACT

An intumescent coating material, the material comprising first and second parts mixable together so that the material will cure by an addition reaction in the presence of a metallic catalyst. The first part including a polydiorganosiloxane polymer having at least two unsaturated groups per molecule. The first part also including the metallic catalyst and a reinforcing filler. The second part including an organohydrogensiloxane crosslinker described by formula $R^1_3Si(OSiR^2_2)_x(OSiMeH)_yOSiR^1_3$, where each $R^2$ is independently selected from saturated hydrocarbon radicals comprising from 1 to 10 carbon atoms or aromatic hydrocarbon radicals and each $R^1$ is independently selected from hydrogen or $R^2$, x is zero or an integer and y is an integer. The organohydrogensiloxane has at least three Si—H bonds per molecule.

23 Claims, No Drawings

(56) References Cited

U.S. PATENT DOCUMENTS

| | | | |
|---|---|---|---|
| 2004/0170768 A1 | 9/2004 | Ahmed et al. | |
| 2015/0218403 A1* | 8/2015 | Lu .................. | C08K 5/5205 |
| | | | 524/140 |
| 2016/0122248 A1* | 5/2016 | Jansen ............. | C04B 35/013 |
| | | | 501/101 |

OTHER PUBLICATIONS

International Search Report for Application No. PCT/GB2016/050949 dated Jul. 5, 2016.

Rainer Sturm, "Expanded Graphite", Graphit Kropfmuehl, A member of Advanced Metallurgical Group N.V., Jul. 2013.

* cited by examiner

COATING MATERIAL

RELATED APPLICATIONS

The present invention is a U.S. National Stage under 35 USC 371 patent application, claiming priority to Serial No. PCT/GB2016/050949, filed 4 Apr. 2016; which claims priority of GB 1505769.8, filed on 2 Apr. 2015 and GB 1601605.7, filed on 28 Jan. 2016, the entirety of all of which are incorporated herein by reference.

This invention concerns an intumescent coating material, and also a method of applying an intumescent coating.

It is often required to provide an intumescent coating around substrates such as pipework, valves and other process components, structural members, and particularly in hydrocarbon facilities. Such a coating forms a protective char and insulates the substrate which delays the effects of a fire, and slows the rate of temperature increase of the coated substrate. This therefore potentially protects the substrate from failing or delays the occurrence of failure, thereby providing additional time to permit evacuation of personnel and/or fire fighting.

All proportions referred to in this specification are indicated as weight %.

According to a first aspect of the invention there is provided an intumescent coating material, the material comprising first and second parts mixable together so that the material will cure by an addition reaction in the presence of a metallic catalyst; the first part including a polydiorganosiloxane polymer having at least two unsaturated groups per molecule, the first part also including the metallic catalyst and a reinforcing filler; and the second part including an organohydrogensiloxane crosslinker described by formula $R^1_3Si(OSiR^2_2)_x(OSiMeH)_yOSiR^1_3$, where each $R^2$ is independently selected from saturated hydrocarbon radicals comprising from 1 to 10 carbon atoms or aromatic hydrocarbon radicals and each $R^1$ is independently selected from hydrogen or $R^2$, x is zero or an integer and y is an integer, the organohydrogensiloxane having at least three Si—H bonds per molecule.

The second part may also include the polydiorganosiloxane polymer having at least two unsaturated groups per molecule and the reinforcing filler.

The polydiorganosiloxane polymer may constitute between 35 and 65% of the material, and more desirably between 40 and 50% of the material. The polydiorganosiloxane polymer may have a viscosity within a range of 20 to 200 Pa·s at 25° C.

The organohydrogensiloxane crosslinker may constitute between 1 and 7% of the material.

The metallic catalyst may be an organometallic complex. The metallic catalyst may be a platinum group hydrosilylation catalyst, and may include catalysts selected from the platinum group metals, or transition metals, of the periodic table of the elements, such as platinum, ruthenium, rhodium, palladium, osmium and iridium; and compounds thereof.

The reinforcing filler may be precipitated silica and/or calcined silica filler. The silica filler may be present in the composition in an amount of from 10 to 40% wt., and preferably may be present in the composition in an amount of from 10 to 30% wt.

The first part may include graphite, and the material may include between 10 and 30% graphite.

Two grades of graphite may be included in the first part, with a first grade with a relatively low thermal expansion, and a second grade with a relatively high thermal expansion.

The first grade of graphite may have a thermal expansion of between 20 and 100 cm$^3$/g and more particularly between 40 and 80 cm$^3$g.

The first grade of graphite may have a particle size of less than 75 μm.

The second grade of graphite may have a thermal expansion of between 100 and 600 cm$^3$/g and more particularly between 250 and 450 cm$^3$/g.

The second grade of graphite may have a particle size of 80% greater than 300 μm.

The second grade of graphite may have an ignition temperature of greater than 150° C., and more particularly greater than 200° C., and the ignition temperature may be between 200 and 230° C.

The material may include between 5 and 25% of the first grade of graphite. The material may include up to 10% of the second grade of graphite.

The first part of the material may include glass frit, and the material may include between 5 and 20% glass frit, and more desirably between 10 and 15% glass frit.

The first part of the material may include ceramic fibres. The material may include between 1 and 5% ceramic fibres, and more particularly between 2 and 4% ceramic fibres.

The first part may include one or more flame retardant additives. The flame retardant additive may be one or more of magnesium hydroxide, Huntite, hydromagnesite, Mica, zinc borate, aluminium trihydrate or boric acid. The flame retardant additive may be present in an amount of from 0.1 to 15% wt, and may be present in an amount from 0.1 to 7% wt, and may be present in an amount from 0.1 to 1% wt.

The second part may include an inhibitor to inhibit platinum catalyzed hydrosilylation reactions at ambient temperature (25° C.). The inhibitor may be an acetylenic alcohols, such as 2-methyl-3-butyn-2-ol and 1-ethynyl-1-cyclohexanol 3-butyn-1-ol, 3-butyn-2-ol, propargylalcohol, 2-phenyl-2-propyn-1-ol, 3,5-dimethyl-1-hexyn-3-ol, 1-ethynylcyclopentanol, 1-phenyl-2-propynol, 3-methyl-1-penten-4-yn-3-ol, and mixtures thereof, or an olefinically substituted siloxane such as a cyclic methylvinylsiloxane.

The second part may include fumed silica, and the fumed silica may be present in an amount of from 1% to 5%, or more preferably from 1 to 3%.

The second part may include glass microspheres, and the glass microspheres may be present in an amount of from 0.1% to 5%, or more preferably from 1 to 3%.

According to a second aspect of the invention there is provided a method of applying an intumescent coating onto a substrate, the method including applying a coating material according to any of the preceding sixteen paragraphs onto the substrate.

The coating thickness may be between 4 and 18 mm, and more particularly may be between 8 and 12 mm.

The substrate may be made of metal or composite material.

The substrate may be a component in a hydrocarbon facility, and may be of any of pipework, a process vessel, accommodation modules, or a structural component.

The intumescent coating material may be applied onto the substrate by spraying, trowelling or brushing.

A solvent may be added to the coating material to provide a required viscosity for application. The solvent may be a silicone solvent and may be any of hexamethyldisiloxane, octamethyltrisiloxane or decamethyltetrasiloxane.

Alternatively the intumescent coating material may be applied onto a foam backing layer, and then the coated layer may be adhered onto the substrate. The backing layer may be a silicone foam. The foam backing layer may be applied against the substrate, or the intumescent coating material may be applied against the substrate.

According to a third aspect of the invention there is provided a body of intumescent material, the body comprising a cured body of intumescent coating material according to any of said preceding sixteen paragraphs.

The body may be in the form of a sheet, roll or profiled member.

When in the form of a sheet, the sheet may be between 4 and 18 mm thick, and more particularly between 8 and 12 mm thick.

The intumescent material may be cured in a mould to provide a body of a required shape.

A backing layer or layers may be applied to the body, and the backing layer may be of PTFE.

A double sided adhesive layer may be applied to one side of the body.

Embodiments of the present invention will now be described by way of example only.

The constituents of eight intumescent coating materials according to the invention, with all proportions being indicated as weight %, are indicated in the Tables 1 and 2 below.

EXAMPLES

First Part

TABLE 1

|  | 1 | 2 | 3 | 4 | 5 | 6 | 7 | 8 |
|---|---|---|---|---|---|---|---|---|
| Mixture A* | 58.8 | 54.9 | 53.2 | 54.1 | 53.2 | 53.2 | 53.2 | 53.3 |
| Ceramic fibres | — | 3.8 | 2.7 | 2.7 | 2.7 | 2.7 | 2.7 | 2.7 |
| Fumed silica | — | — | 1.6 | 1.6 | 1.6 | 1.6 | 1.6 | 2.1 |
| Glass frit | 11.8 | 11 | 10.6 | 10.8 | 10.6 | 10.6 | 10.6 | 10.7 |
| Magnesium hydroxide | 11.8 | 11 | 2.7 | 1.1 | 2.7 | 2.7 | 2.7 | 2.7 |
| $1^{st}$ grade graphite | 11.8 | 11 | 21.3 | 21.6 | 15.9 | 13.8 | 11.7 | 11.7 |
| $2^{nd}$ grade graphite | — | — | — | — | 5.3 | 7.4 | 9.5 | 9.6 |

*Mixture A is 75% by weight of a dimethylvinyl siloxy terminated dimethylsiloxane, about 25% by weight treated precipitated silica filler with a suitable amount of platinum catalyst Second Part

TABLE 2

|  | 1 | 2 | 3 | 4 | 5 | 6 | 7 | 8 |
|---|---|---|---|---|---|---|---|---|
| Mixture B* | 5.8 | 6.6 | 6.4 | 6.5 | 6.4 | 6.4 | 6.4 | 6.4 |
| Glass microspheres | — | 1.7 | 1.6 | 1.6 | 1.6 | 1.6 | 1.6 | — |
| Fumed silica | — | — | 1.6 | 1.6 | — | — | — | 0.8 |

*Mixture B is 40% by weight of a dimethylvinyl siloxy terminated dimethylsiloxane, 20% by weight of a trimethylsiloxy terminated dimethylmethylhydrogensiloxane, about 2% by weight of inhibitor and the remainder is treated precipitated silica filler.

Polydiorganosiloxane Polymer

The first part used here is polydiorganosiloxane polymer having at least two unsaturated groups per molecule. The at least 2 unsaturated groups could be alkenyl or alkynyl groups, for example, a diorganoalkenylsiloxy terminated polydiorganosiloxane described by formula (alkenyl)$R^4{}_2SiO(R^3{}_2SiO)_m SiR^4{}_2$(alkenyl).

Examples of alkenyl groups include vinyl, allyl, butenyl, pentenyl, cyclohexenyl and hexenyl groups but vinyl groups are preferred. $R^3$ and $R^4$ are independently selected from saturated monovalent hydrocarbon radicals comprising 1 to 20 carbons atoms. Up to 5% of $R^3$ groups may comprise alkenyl groups as above, typically vinyl groups and m represents a degree of polymerization equivalent to a viscosity of 20 to 200 Pa·s at 25° C., alternatively m represents a degree of polymerization equivalent to a viscosity of 40 to 70 Pa·s at 25° C.

It is preferred that each $R^4$ is an alkyl group comprising one to four carbon atoms. Most preferred is when all of the $R^4$ substituents are methyl.

It is also desirable that at least one of the $R^3$ radicals substituted on the non-terminal silicon atoms is an alkyl comprising 1 to 4 carbon atoms, preferably methyl. The other $R^3$ radicals substituted on the non-terminal silicon atoms can be alkyls such as methyl or ethyl; substituted alkyls such as chloromethyl, 3-chloropropyl or 3,3,3-trifluoropropyl; cycloalkyls such as cyclopentyl or cyclohexyl; or aryls such as phenyl, xylyl, tolyl and naphthyl or alkenyl groups as hereinbefore discussed.

The preferred polydiorganosiloxane polymer is a dimethylvinylsiloxy endblocked polydimethylsiloxane having a viscosity of 20 to 200 Pa·s at 25° C., alternatively 40 to 70 Pa·s at 25° C. Preferred is when polydiorganosiloxane polymer comprises 45 to 65% wt. alternatively 52 to 60% wt. of the composition. Unless otherwise indicated all viscosity measurements are based on using an AR550 rheometer (TA/Waters) at 25° C., using a 2 cm cone-plate geometry.

Reinforcing Filler

The reinforcing filler is typically precipitated silica (wet silica) and/or calcined silica filler with a specific surface area measured by BET method of at least 50 m$^2$/g up to 450 m$^2$/g. Precipitated silica (wet silica) is preferred. The silica filler is present in the composition in an amount of from 10 to 40% wt., alternatively 10 to 30% wt. based on the total weight of the composition.

A surface treatment of the filler(s) may be performed, for example with a fatty acid or a fatty acid ester such as a stearate, or with organosilanes, organosiloxanes, or organosilazanes or short chain siloxane diols to render the filler(s) hydrophobic and therefore easier to handle and obtain a homogeneous mixture with the other sealant components. The surface treatment of the fillers makes the ground silicate minerals easily wetted by the polydiorganosiloxane polymer. These surface modified fillers do not clump, and can be homogeneously incorporated into the polydiorganosiloxane polymer. This results in improved room temperature mechanical properties of the uncured compositions.

Organohydrogensiloxane Crosslinker

The organohydrogensiloxane is described by the formula: $R^1{}_3Si(OSiR^2{}_2)_x(OSiMeH)_y OSiR^1{}_3$, where each $R^2$ is independently selected from saturated hydrocarbon radicals comprising one to ten carbon atoms or aromatic hydrocarbon radicals and each $R^1$ is independently selected from hydrogen or $R^2$, x is zero or an integer and y is an integer said organohydrogensiloxane having at least three Si—H bonds per molecule. In one embodiment x=0 to 40, y=3 to 50 and x+y is from 3 to 50. $R^1$ is, for example, an alkyl group having from 1 to 4 carbon atoms, such as methyl or ethyl; a substituted alkyl such as chloromethyl and 3,3,3-trifluoropropyl; and an aryl such as phenyl. Preferred is when $R^1$ is methyl. Organohydrogensiloxane is added to the present composition at a concentration sufficient to crosslink the composition.

In a preferred composition, organohydrogensiloxane is added at a concentration sufficient to provide 1 to 5 silicon-bonded hydrogen atoms per silicon-bonded unsaturated radical, typically alkenyl radical in the polydiorganosiloxane polymer. Most preferred is when organohydrogensiloxane provides 1.0 to 2.2 silicon-bonded hydrogen atoms per silicon-bonded unsaturated, typically alkenyl radical.

Metallic Catalyst

The metallic catalyst, which may be included in the first part, is a platinum group hydrosilylation catalyst present in an amount sufficient to effect curing of the composition. These include catalysts selected from the platinum group metals, or transition metals, of the periodic table of the elements, such as platinum, ruthenium, rhodium, palladium, osmium and iridium; and compounds thereof. The catalyst used in the scope of the present invention may be selected from the platinum group catalysts, such as chloroplatinic acid, chloroplatinic acid dissolved in an alcohol or a ketone and these solutions which have been ripened, chloroplatinic acid-olefin complexes, chloroplatinic acid-alkenylsiloxane complexes, chloroplatinic acid-diketone complexes, platinum black, platinum supported on a carrier, and mixtures thereof.

The catalyst is added in a quantity sufficient to cure the polydiorganosiloxane polymer and the organohydrogensiloxane present in the composition. For example, it may be added in a quantity of platinum atom that provides of from 0.1 to 500 weight-ppm (parts per million), alternatively of from 1 to 200 weight-ppm, alternatively of from 1 to 100 weight-ppm, of platinum atom in the catalyst based on the total weight of polydiorganosiloxane polymer.

Flame Retardant Additive

The flame retardant additive acts as endothermic intumescent additive which absorbs heat, as well as releasing water and swelling in a fire situation. In the present examples, the fire retardant additive is magnesium hydroxide, but in may also be one or more of, Huntite, hydromagnesite, Mica, zinc borate, aluminium trihydrate or boric acid. The flame retardant additive may be present in an amount of from 0.1 to 15% wt, and may be present in an amount from 0.1 to 7% wt, and may be present in an amount from 0.1 to 1% wt.

Inhibitor

In some examples of the invention, the second part includes an inhibitor to inhibit platinum catalyzed hydrosilylation reactions at ambient temperature (25° C.), and prolong the "working time" or "pot life" of the composition. The inhibitor may be an acetylenic alcohols, such as 2-methyl-3-butyn-2-ol and 1-ethynyl-1-cyclohexanol 3-butyn-1-ol, 3-butyn-2-ol, propargylalcohol, 2-phenyl-2-propyn-1-ol, 3,5-dimethyl-1-hexyn-3-ol, 1-ethynylcyclopentanol, 1-phenyl-2-propynol, 3-methyl-1-penten-4-yn-3-ol, and mixtures thereof, or an olefinically substituted siloxanes such as a cyclic methylvinylsiloxane.

The inhibitor may be added in the range of from 10 to 10,000 weight-ppm in the curable silicone elastomer composition. Inhibitor concentrations as low as one mole of inhibitor per mole of platinum may in some instances impart satisfactory storage stability and cure rate. In other instances inhibitor concentrations up to 500 moles of inhibitor per mole of platinum may be required. The optimum concentration for a given inhibitor in a composition is readily determined by routine experimentation.

Graphite

The graphite is the main source of spumesence, causing the intumescence of the material. The first grade of graphite has a relatively low expansion coefficient, with an expansion ratio of 60 cm$^3$/g, and a particle size of >75 μm.

The second grade of graphite has a relatively high expansion coefficient, and has an expansion ratio of 350 cm$^3$/g, with a particle size of 80% >300 μm. The ignition temperature for this grade of graphite is between 200 and 230° C.

Other Additives

The ceramic fibres add char strength.

The fumed silica in the second part acts as a thixotrope to prevent slumping, thereby permitting spray of the material.

The glass frit vitrifies when the material intumesces, and thereby helps solidification of the material in a fire situation.

In the second part the glass microspheres increase viscosity, improve insulation, and decrease density. The fumed silica acts as a thixotrope.

By appropriate choice of proportions, the respective viscosities of the first and second parts are balanced so that these materials can be applied in a required form.

Typically, the catalyst is kept separate from crosslinker. For example, each part may contain a portion of a mixture comprising the polydiorganosiloxane polymer and reinforcing filler with the platinum hydrosilylation catalyst being added to one part (the first part) and the organohydrogensiloxane crosslinker being added to other part (the second part).

The two parts can then be mixed together immediately prior to use. Optionally, the inhibitor may be present in either part but the second part is often preferred. Other optional additives may be present. Typically these optional additives are retained in the first part but may be in the second part if preferred. The additional additives may include mold release agents, pigments, dyes, adhesion promoters, flame retardants, heat stabilizers and ultraviolet light stabilizers.

In one example, the polydiorganosiloxane polymer, reinforcing filler and platinum hydrosilylation catalyst are present in the first part of the composition, and the polydiorganosiloxane polymer, reinforcing filler, organohydrogensiloxane crosslinker and inhibitor are present in the second part of the composition. Additional additives may be present in either the first or second as preferred but are usually added to the first part.

The materials may for instance be applied by spraying, with a twin feed of the first and second parts such that the two parts are mixed immediately before application onto a substrate. In some instances it may be desirable or required to add a solvent to the materials during or after mixing to provide a required, and generally reduced, viscosity. The solvent may be a silicone solvent and may for example be any of hexamethyldisiloxane, octamethyltrisiloxane or decamethyltetrasiloxane.

Alternatively the intumescent coating material may be applied onto a foam backing layer, and then the coated layer may be adhered onto the substrate. The backing layer may be a silicone foam. The foam backing layer may be applied against the substrate, or the intumescent coating material may be applied against the substrate. An adhesive backing may be provided on the coated layer, and perhaps initially with a removable backing paper, such the coating material can readily be stuck onto a substrate on site.

The materials when mixed will cure by addition curing, and in one example the reaction is between vinyl endblocked polydimethylsiloxanes in the first part and SiH groups on the organohydrogensiloxane crosslinker in the second part, as indicated below. The reaction is catalysed by platinum.

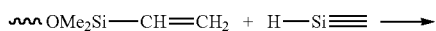

Pt Catalyst

As indicated the first and second parts can be mixed immediately before application to a substrate, and the application may be by spraying, or the material could for example be brushed or trowelled on or applied by other methods but also could be applied onto a backing material and then applied onto a substrate. A layer typically of 10 mm may be applied for instance to pipework, process vessels, other components or structural components in a hydrocarbon facility.

Coatings according to the invention have been found to provide a number of advantages relative to prior coatings. Previously coatings have often used a condensation curing mechanism and this can lead to handling difficulties such as problems in curing fully across a layer, and limiting the thickness of layer which can be applied. Coatings according to the invention have generally been found to have greater tensile strength than such condensation curing coatings.

With coatings according to the invention the silicone resin has been found to provide significant flexibility to the coating. With these coatings an endothermic reaction occurs during expansion, and cracking of the coating during swelling is generally avoided. This lack of cracking means for instance that the material can be applied to I-beams or other formations with sharp returns, but will retain its integrity and not crack during a fire scenario.

With coatings according to the invention, intumescence has generally been found to occur at higher temperatures than other coatings, such as for example at 150 to 230° C. Coatings according to the invention have generally been found to provide improved environmental, water and temperature resistance relative to prior coatings.

In one embodiment of the invention, bodies of the intumescent material are formed. These bodies may be in the form of sheets, rolls or profiled members. When in the form of a sheet the coating thickness may be between 4 and 18 mm, particularly between 8 and 12 mm, and a 10 mm thick sheet may be provided.

The two parts of the material are mixed and transferred into an appropriate mould to cure into the required body. The body, and particularly when in the form of a sheet or roll, may have a backing layer for instance of PTFE which may be located in the mould prior to transfer of the material thereinto. A double sided adhesive layer may be provided on the body to permit mounting onto a substrate or item.

Examples 9-14

The measurable properties of six intumescent coating materials (examples 9 to 14) according to the invention, with all proportions being indicated as weight %, are indicated in Table 3 below and three comparative examples are indicated in Table 4 below.

TABLE 3

| | | | Example number | | | | |
|---|---|---|---|---|---|---|---|
| | | 9 | 10 | 11 | 12 | 13 | 14 |
| | Mixture A | 62.8 | 60.8 | 63.3 | 62.8 | 60.8 | 58.3 |
| | Ceramic Fibres | 2 | 4 | 4 | 2 | 4 | 4 |
| | Fumed Silica | 2.3 | 2.3 | 2.3 | 2.3 | 2.3 | 2.3 |
| | Glass Frit | 10 | 10 | 7.5 | 10 | 10 | 12.5 |
| | Magnesium Hydroxide | 2.9 | 2.9 | 2.9 | 2.9 | 2.9 | 2.9 |
| | $1^{st}$ Grade graphite | 15 | 15 | 10 | 10 | 10 | 10 |
| | $2^{nd}$ grade graphite | 5 | 5 | 10 | 10 | 10 | 10 |
| | Graphite Ratio | 3:1 | 3:1 | 1:1 | 1:1 | 1:1 | 1:1 |
| | Second Part | 8.48 | 8.21 | 8.55 | 8.48 | 8.21 | 7.87 |
| viscosity of the base at shear rate of: | 1 [1/s] | 442 | 724 | 796 | 582 | 704 | 1033 |
| | 10 [1/s] | 160 | 198 | 176 | 158 | 196 | 216 |
| Curing features | snap time [min] | 70 | 75 | 88 | 76 | 72 < 90 | 63 < 81 |
| | CID 24 h [mm] | 10 | 10 | 10 | 10 | 10 | 10 |
| | Tackiness 1 Day | 0 | 0 | 0 | 0 | 0 | 0 |
| mechanical properties of cured material | Tensile Force on Dumbbells [MPa] | 1.8 | 1.8 | 1.7 | 1.6 | 1.9 | 2.0 |
| | Elongation at Max [%] | 102 | 92 | 94 | 87 | 102 | 88 |
| | Shore A | 61 | 64 | 60 | 61 | 62 | 61 |
| | Dolly*pull-off Force (max), [MPa] | 1.02 | 0.66 | 0.96 | 0.67 | 1.00 | 0.84 |
| | Dolly* adhesion** - type of failure | AF | AF/CF | CF/AF | AF | CF | CF |
| Fire properties* | time to reach 500° C. [min]; 4 mm wet thickness | 19 | 21 | 28 | 29 | 28 | 27 |
| | time to reach 500° C. [min]; 8 mm wet thickness | 35 | 38 | 36 | 36 | 35 | 35 |
| | time to reach 500° C. [min] (4 mm coating) with AirJet | 5 | 5.5 | 4 | 2.5 | 3.5 | 2.5 |

TABLE 4

| | | Example number | | |
|---|---|---|---|---|
| | | Comp. 1 | Comp. 2 | Comp. 3 |
| Formulation details | Fibre % | | no | no |
| | Graphite Ratio | | 10% high expansion | 15% low expansion |
| | Frit % | | 0 | 0 |

TABLE 4-continued

| | | Example number | | |
|---|---|---|---|---|
| | | Comp. 1 | Comp. 2 | Comp. 3 |
| viscosity of the base at shear rate of: | 1 [1/s] | | | 260 |
| | 10 [1/s] | | | 167 |
| Curing features | snap time [min] | | | 24 |
| | CID 24 h [mm] | | 10 | 10 |
| | Tackiness 1 Day | | 3 | 0 |
| mechanical properties of cured material | Tensile Force on Dumbbells [MPa] | | 0.60 | 1.12 |
| | Elongation at Max [%] | | 74 | 102 |
| | Shore A | | 29 | 39 |
| | Dolly*pull-off Force (max), [MPa] | | 0.37 | 0.61 |
| | Dolly* adhesion**-type of failure | | | |
| Fire properties* | time to reach 500° C. [min]; 4 mm wet thickness | 30.2*** | 26 | 22 |
| | time to reach 500° C. [min]; 8 mm wet thickness | 31** | 35 | 51 |
| | time to reach 500° C. [min](4 mm coating) with AirJet | 3.5*** | Not measured | 8.2 |

*Substrate pre-coated with Dow Corning ® 1200 OS Primer Clear from Dow Corning Corporation of Midland Michigan USA; 24 h cure before experimentation
**Average of two; AF = Adhesive failure; CF = Cohesive failure.
***Substrate pre-coated with EPODUX ® ZINC 57-35 primer from Peintures Maestria, 09100 Pamiers, France The percentage of fiber, frit and graphite refer to the first part, as described in the examples 1-8. The graphite ratio refers to the ratio of first and second grade graphite as in examples 1-8. The viscosity was measured using AR550 rheometer available at TA/Waters at 25° C., using a 2 cm cone-plate geometry. Typically a shear rate sweep is performed.

The first and second parts were mixed in a ratio of 1:1 using a speed mixer of type DAC 150.1 FV, commercialized by Hauschild Engineering, Germany. The mix was then put in 2 mm thick moulds and left to cure for 7 days.

Snap time (ST) is the measure of the time the end-user can take to tool the coating to its final shape and was determined as the period of time during which the surface of an applied sheet of the composition could be tooled or worked. ST was measured by spreading the material to form a layer of ca. 0.2-0.3 cm on a clean smooth non porous surface. The sample was exposed to a relative humidity (RH) of 50% at 25° C. At one minute intervals the surface was lightly touched with a metal spatula and the latter was then rapidly drawn away. The process was repeated until the sample did not adhere to the tip of the spatula. The time lapsed from spreading the material until the surface did not adhere to the spatula is ST.

Cure in depth (CID) was determined as the thickness in mm of the composition which was found to have cured to an elastomeric state during ageing at ambient temperature and humidity for a specified period. A value of zero indicates no cure and a value of 10 means fully cured in the time period given. In the table below CID was measured after 24 hours.

Elongation at Break (%) and Tensile Strength (MPa) were measured using a moulded and cured standard test dumbbells (2 mm thick) which had been cured by exposure to atmosphere at room temperature on a flat surface for at least 7 days. Tear strips were cut from the cured sample and stretched to breakpoint in a tensiometer (Zwick, from Zwick, Germany). The values in Table 3 are averages of four independent test dumbbells per sample.

Tackiness refers to the perceived stickiness (sensory assessment) of the material during the CID experiments. Zero stands for "not tacky at all" whereas 5 (the lowest grade) stands for "completely sticky".

Shore A is the result of a standard hardness test in accord with ASTM D2240 type A.

Dolly pull off experiments consist of fixing a metal nut having a diameter of 20 mm and height of 10 mm to a 2 mm thick metal plate using the respective composition as a glue. Optionally the plate can be pre-treated with a primer. Each composition was allowed to cure for 24 h then the external edge of the fixed metal nut was undercut with a razor blade. The nut was then pulled at 90° and the force necessary to disrupt the nut from the plate is measured. At the end of each experiment the type of failure was determined with CF meaning cohesive failure, and AF meaning adhesive failure in the examples hereafter. A cohesive failure is when the break between the nut and plate happens in the silicone coating itself, as opposed to an adhesive failure where the break is at the join between the silicone and one of the metal parts.

Fire tests were designed to mimic the UL1709 Standard for rapid rise fire Tests of Protection Materials for Structural Steel. They were performed in a small scale furnace with external dimensions of 55 cm×55 cm×55 cm and an internal chamber of 26 dm³. A quartz window was utilised to view/video record events in the furnace. In a typical experiment a coating of certain given thickness is applied to a 10×10 cm stainless steel plate and allowed to cure for 24 h. Optionally one could use a primer. The plate is then placed in the furnace and exposed to a flame produced by two burners fed by propane gas and capacity of 20 kW each. An Infrared pyrometer was used to record the temperature at the backside of the coated plate. The furnace is placed at the centre of the exhaust hood. Burner control and pyrometer readings are controlled by the attached computer.

The outcome of the experiment is the time necessary to reach 500° C. on the backside of the plate. The AJ (air jet) is practically the same experiment, but when the temperature of the plate reaches 300° C. the coating is further exposed to a hot air jet. This experiment mimics the dynamic stability of the developed char.

In Table 4, three comparative examples are depicted. Comparative 1 uses a commercially available product Chartek® 7 sold by International Paints a Division of Akzo Nobel. It is understood that this is an organic resin based material.

Comparative 2 utilises a 2 part condensation cure sealant having the following composition:
Part A
(a) 54 parts of OH-terminated polydimethylsiloxane of viscosity of about 14000 mPa·s, viscosity measured at 25° C., using Atnon Paar rheometer MCR 301 or MCR 302 machine with cone-plate geometry of 40 mm
(b) 10 parts high expansion graphite (ES350 F5 from Graphitwerk Kropfmuehl, AG),
(c) 1.5 parts of OH-terminated polydimethylsiloxane of viscosity of about 40 mPa·s (same measurement protocol for viscosity)
(d) 22 parts of stearic acid-treated calcium carbonate
(e) 7 parts of Cloisite® 30B (organoclay commercialized by BYK Additives).
The ingredients of Part A were mixed together to form a paste.

Part B 100 parts by weight of the curing agent part of commercial product DOW CORNING® 3441 SILICONE SEALANT was doped with 8.57 parts of methyl trimethoxy silane and 0.57 parts of dimethyltin dineodecanoate (in each case per 100 parts of the curing agent DOW CORNING® 3441 SILICONE SEALANT). The modified curing agent was used to cure part A; the mixing ratio was 10 mass parts A and 1 part curing agent (Part B).

Comparative 3 utilises a 2 part condensation cure sealant having the following c
omposition:

Part A (a) 63.5% of OH-terminated polydimethylsiloxane of viscosity of about 14000 mPa·s, viscosity measured at 25 C, using Atnon Paar rheometer MCR 301 or MCR 302 machine with cone-plate geometry of 40 mm
(b) 15% low expansion graphite (ES100 c10 from Graphitwerk Kropfmuehl, AG),
(c) 1.5% of OH-terminated polydimethylsiloxane of viscosity of about 40 mPa·s (same measurement protocol for viscosity)
(d) 20% of stearic acid-treated calcium carbonate.

The ingredients of Part A were mixed together to form a paste. Part B was the curing agent of DOW CORNING® 3441 SILICONE SEALANT.

Part A was mixed with Part B and was cured according to the manufacturer's instructions in respect to Part B.

When Dow Corning® 1200 OS Primer Clear was applied it was done so by wiping the substrate with the Primer using fiber-less paper and the excess was removed (per manufacturer's instructions). The intumescent coating material was subsequently applied between 30 to 60 minutes after the application of the primer.

When EPODUX® ZINC 57-35 primer was applied it was done so following the manufacturer's instructions. The intumescent coating material was subsequently applied between 30 to 60 minutes after the application of the primer.

The results show that examples of the present invention provide better mechanical properties of the materials.

The examples generally provide better resistance to fire compared to comp.1 using Chartek® 7 commercial material at 8 mm thickness. The examples of the invention showed a similar resistance to fire compared to comp.1 using Chartek® 7 commercial material at 4 mm thickness. Furthermore, the examples showed similar or better mechanical strength of the char when compared to comp.1 using Chartek® 7 commercial material. It would appear that when considering the above and the fact that the elastomeric silicone based coatings, after cure provides a significant improvement.

It will also be appreciated that comparing the present examples to comps 2 and 3 that the examples herein have much better strength (mechanical properties).

It is to be realised that a wide range of other modifications may be made as required for different applications. Different silicone resins may be used. Different grades of graphite can be used and in different proportions as required for particular applications.

The proportions of the respective materials can be varied to provide a required curing time and speed for different applications.

In the resin, the methyl groups can be substituted with alkyl or alkoxy groups such as (but not limited to) ethyl, phenyl, methoxy, vinyl.

Whilst platinum has been found to be an effective catalyst, it may be possible to use another metal such as a rhodium catalyst.

A mesh, which may be made for instance of stainless steel or basalt, could be included in the material. The mesh should provide additional strength to the char by preventing it from falling off or blowing away. Where the material is applied on a foam backing layer, the mesh may be provided at the interface between the foam backing layer and the intumescent material.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An intumescent coating material, the material comprising first and second parts mixable together so that the material will cure by an addition reaction in the presence of a metallic catalyst; the first part including a polydiorganosiloxane polymer having at least two unsaturated groups per molecule, the first part also including the metallic catalyst and a reinforcing filler; and the second part including an organohydrogensiloxane crosslinker described by formula $R^1{}_3Si(OSiR^2{}_2)_x(OSiMeH)_yOSiR^1{}_3$, where each $R^2$ is independently selected from saturated hydrocarbon radicals comprising from 1 to 10 carbon atoms or aromatic hydrocarbon radicals and each $R^1$ is independently selected from hydrogen or $R^2$, x is zero or an integer and y is an integer, the organohydrogensiloxane having at least three Si—H bonds per molecule, wherein the first part includes graphite, wherein two grades of graphite are included in the first part, with a first grade with a low thermal expansion, and a second grade with a high thermal expansion, in which the first grade of graphite has a particle size of less than 75 μm and the second grade of graphite has a particle size of 80% greater than 300 μm, in which the first grade of graphite has a thermal expansion of between 20 and 100 cm$^3$/g.

2. A material according to claim 1, in which the polydiorganosiloxane polymer constitutes between 35 and 65% by weight of the material.

3. A material according to claim 1, in which the first grade of graphite has a thermal expansion of between 40 and 80 cm$^3$/g.

4. A material according to claim 1, in which the second grade of graphite has a thermal expansion of between 100 and 600 cm$^3$/g.

5. A material according to claim 1, in which the second grade of graphite has a thermal expansion of between 250 and 450 cm$^3$/g.

6. A material according to claim 1, in which the second grade of graphite has an ignition temperature of greater than 150° C.

7. A material according to claim 1, in which the material includes between 5 and 25% by weight of the first grade of graphite.

8. A material according to claim 1, in which the material includes up to 10% by weight of the second grade of graphite.

9. A material according to claim 1, in which the first part of the material includes ceramic fibres.

10. A material according to claim 9, in which the material includes between 1 and 5% by weight ceramic fibres.

11. A material according to claim 1, in which the first part includes one or more flame retardant additives, the flame retardant additive being one or more of magnesium hydroxide, Huntite, hydromagnesite, Mica, zinc borate, aluminium trihydrate or boric acid, wherein the flame retardant additive is present in an amount of from 0.1 to 15% by weight.

12. A material according to claim 1, in which the second part includes fumed silica.

13. A material according to claim 12, in which the fumed silica is present in an amount of from 1% by weight to 5% by weight.

14. A material according to claim 1, in which the second part includes glass microspheres.

15. A material according to claim 14, in which and the glass microspheres are present in an amount of from 0.1% by weight to 5% by weight.

16. A material according to claim 1, in which the ratio of first grade and second grade graphite is 1:1.

17. An intumescent coating material, the material comprising first and second parts mixable together so that the material will cure by an addition reaction in the presence of a metallic catalyst; the first part including a polydiorganosiloxane polymer having at least two unsaturated groups per molecule, the first part also including the metallic catalyst and a reinforcing filler; and the second part including an organohydrogensiloxane crosslinker described by formula $R^1_3Si(OSiR^2_2)_x(OSiMeH)_yOSiR^1_3$, where each $R^2$ is independently selected from saturated hydrocarbon radicals comprising from 1 to 10 carbon atoms or aromatic hydrocarbon radicals and each $R^1$ is independently selected from hydrogen or $R^2$, x is zero or an integer and y is an integer, the organohydrogensiloxane having at least three Si-H bonds per molecule, the first part including graphite, wherein two grades of graphite are included in the first part, with a first grade with a low thermal expansion, and a second grade with a high thermal expansion, in which the ratio of first grade and second grade graphite is 1:1.

18. A material according to claim 1, in which the ratio of first grade and second grade graphite is from 1:1 to 3:1.

19. An intumescent coating material, the material comprising first and second parts mixable together so that the material will cure by an addition reaction in the presence of a metallic catalyst; the first part including a polydiorganosiloxane polymer having at least two unsaturated groups per molecule, the first part also including the metallic catalyst and a reinforcing filler; and the second part including an organohydrogensiloxane crosslinker described by formula $R^1_3Si(OSiR^2_2)_x(OSiMeH)_yOSiR^1_3$, where each $R^2$ is independently selected from saturated hydrocarbon radicals comprising from 1 to 10 carbon atoms or aromatic hydrocarbon radicals and each $R^1$ is independently selected from hydrogen or $R^2$, x is zero or an integer and y is an integer, the organohydrogensiloxane having at least three Si—H bonds per molecule, the first part including graphite, wherein two grades of graphite are included in the first part, with a first grade with a low thermal expansion, and a second grade with a high thermal expansion, in which the ratio of first grade and second grade graphite is from 1:1 to 3:1.

20. An intumescent coating material, the material comprising first and second parts mixable together so that the material will cure by an addition reaction in the presence of a metallic catalyst; the first part including a polydiorganosiloxane polymer having at least two unsaturated groups per molecule, the first part also including the metallic catalyst and a reinforcing filler; and the second part including an organohydrogensiloxane crosslinker described by formula $R^1_3Si(OSiR^2_2)_x(OSiMeH)_yOSiR^1_3$, where each $R^2$ is independently selected from saturated hydrocarbon radicals comprising from 1 to 10 carbon atoms or aromatic hydrocarbon radicals and each $R^1$ is independently selected from hydrogen or $R^2$, x is zero or an integer and y is an integer, the organohydrogensiloxane having at least three Si-H bonds per molecule, wherein the first part includes graphite, wherein two grades of graphite are included in the first part, with a first grade with a low thermal expansion, and a second grade with a high thermal expansion, in which the first grade of graphite has a particle size of less than 75 μm and the second grade of graphite has a particle size of 80% greater than 300 μm, in which the second grade of graphite has a thermal expansion of between 100 and 600 cm$^3$/g.

21. A method of applying an intumescent coating onto a substrate, the method including applying a coating material according to claim 1, 17, 19, or 20 onto the substrate.

22. A body of intumescent material, the body comprising a cured body of intumescent coating material according to claim 1, 17, 19, or 20.

23. A material according to claim 1, in which the first part of the material includes glass frit, wherein the material includes between 5 and 20% by weight glass frit.

* * * * *